(12) United States Patent
Lee et al.

(10) Patent No.: US 10,834,322 B2
(45) Date of Patent: Nov. 10, 2020

(54) CAMERA MODULE WITH ACTUATOR AND LENS MODULE POSITION DETECTION

(71) Applicant: Samsung Electro-Mechanics Co., Ltd., Suwon-si (KR)

(72) Inventors: Youn Joong Lee, Suwon-si (KR); Sung Man Pang, Suwon-si (KR); Jin Kim, Suwon-si (KR); Sang Hyun Min, Suwon-si (KR); Ja Hwi Cho, Suwon-si (KR); Koon Shik Cho, Suwon-si (KR); Je Hyeon Yu, Suwon-si (KR); Ho Kwon Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 154 days.

(21) Appl. No.: 16/014,285

(22) Filed: Jun. 21, 2018

(65) Prior Publication Data

US 2019/0124265 A1 Apr. 25, 2019

(30) Foreign Application Priority Data

Oct. 24, 2017 (KR) .......................... 10-2017-0138344

(51) Int. Cl.
*H04N 5/232* (2006.01)
*G02B 27/64* (2006.01)
(Continued)

(52) U.S. Cl.
CPC ........... *H04N 5/23287* (2013.01); *G02B 7/08* (2013.01); *G02B 7/09* (2013.01); *G02B 13/0015* (2013.01);
(Continued)

(58) Field of Classification Search
CPC ............ H04N 5/23287; H04N 5/2253; H04N 5/2254; H04N 5/2257; G02B 7/08; G02B 7/09; G02B 13/0015; G02B 27/646
See application file for complete search history.

(56) References Cited

U.S. PATENT DOCUMENTS 5,146,071 A * 9/1992 Ookubo ................. G02B 7/102
250/201.2
6,347,179 B1 * 2/2002 Higuchi ............... G11B 15/026
348/E5.021
(Continued)

FOREIGN PATENT DOCUMENTS

JP 4390347 B2 12/2009
JP 2011179914 A * 9/2011
(Continued)

*Primary Examiner* — Antoinette T Spinks
(74) *Attorney, Agent, or Firm* — NSIP Law

(57) ABSTRACT

An actuator for a camera module includes two or more detectable elements, the detectable elements are respectively disposed on a first and second surface of a lens barrel, an oscillating element including a first oscillation circuit unit that includes two or more oscillation circuits facing the first surface of the lens barrel, and a second oscillation circuit unit that includes two or more oscillation circuits facing the second surface of the lens barrel, and a determining device that calculates a position of the lens barrel in response to oscillation signals output from the oscillating element. The determining device is configured to calculate the position of the lens barrel based on determined frequencies of oscillation signals of the first oscillation circuit unit and the second oscillation circuit unit.

20 Claims, 3 Drawing Sheets

(51) Int. Cl.
  *H04N 5/225* (2006.01)
  *G02B 13/00* (2006.01)
  *G02B 7/09* (2006.01)
  *G02B 7/08* (2006.01)

(52) U.S. Cl.
  CPC ......... *G02B 27/646* (2013.01); *H04N 5/2253* (2013.01); *H04N 5/2254* (2013.01); *H04N 5/2257* (2013.01)

(56) References Cited

U.S. PATENT DOCUMENTS

| | | | | |
|---|---|---|---|---|
| 2004/0113601 | A1* | 6/2004 | Hashimoto | G05F 1/46 323/312 |
| 2011/0096178 | A1* | 4/2011 | Ryu | H04N 5/2252 348/208.2 |
| 2012/0170616 | A1* | 7/2012 | Tsai | G01K 7/01 374/163 |
| 2016/0084924 | A1* | 3/2016 | Osumi | G01R 33/1223 324/236 |
| 2016/0087583 | A1* | 3/2016 | Matsumoto | H05K 1/0215 331/116 R |
| 2016/0154249 | A1* | 6/2016 | Yeo | H04N 5/2254 359/557 |
| 2016/0238732 | A1* | 8/2016 | Sato | G01V 3/105 |
| 2016/0277684 | A1* | 9/2016 | Park | G02B 27/646 |
| 2017/0264814 | A1* | 9/2017 | Park | H04N 5/23254 |
| 2018/0243804 | A1* | 8/2018 | Magee | B08B 7/04 |
| 2018/0284568 | A1* | 10/2018 | Oh | G03B 3/10 |
| 2018/0364445 | A1* | 12/2018 | Osaka | H01L 43/06 |
| 2019/0129133 | A1* | 5/2019 | Yu | G02B 7/102 |
| 2019/0162562 | A1* | 5/2019 | Min | G03B 5/02 |
| 2019/0162930 | A1* | 5/2019 | Min | G01D 5/006 |

FOREIGN PATENT DOCUMENTS

| | | |
|---|---|---|
| JP | 10-2013-0077216 A | 7/2013 |
| JP | 2014-92482 A | 5/2014 |
| KR | 20170105234 A * | 9/2017 |

* cited by examiner

CAMERA MODULE WITH ACTUATOR AND LENS MODULE POSITION DETECTION

CROSS-REFERENCE TO RELATED APPLICATION

This application claims the benefit under 35 USC 119(a) of Korean Patent Application No. 10-2017-0138344 filed on Oct. 24, 2017 in the Korean Intellectual Property Office, the entire disclosure of which is incorporated herein by reference for all purposes.

BACKGROUND

1. Field

The present disclosure relates to an actuator for a camera module.

2. Description of Related Art

Portable communication terminals such as cellular phones, personal digital assistants (PDAs), portable personal computers (PCs), for example, have been implemented with the ability to perform the transmission of video data, in addition to the transmission of text or audio data. In accordance with this trend, camera modules have recently been installed in the portable communication terminals as standard components in order to enable the transmission of video data and allow for video chatting, and similar features.

Generally, camera modules include a lens barrel having lenses disposed therein, a housing that accommodates the lens barrel therein, and an image sensor that converts an image of a subject into an electrical signal. A single focus type camera module, that captures an image of a subject at a fixed focus, may be used as the camera module. However, recently, in accordance with developments in communication technology, a camera module including an actuator that enables autofocusing (AF) has been implemented. The camera module may include an actuator for performing optical image stabilization (OIS) in order to suppress a resolution decrease phenomenon due to a user's hand shaking while capturing an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator for a camera module includes two or more detectable elements, the detectable elements being respectively disposed on a first surface of a lens barrel and a second surface of the lens barrel; an oscillating element comprising a first oscillation circuit unit that includes two or more oscillation circuits disposed to face the first surface of the lens barrel, and a second oscillation circuit unit that includes two or more oscillation circuits disposed to face the second surface of the lens barrel; and a determining device configured to calculate a position of the lens barrel in response to oscillation signals output from the oscillating element, wherein the determining device is configured to calculate the position of the lens barrel based on determined frequencies of oscillation signals of the first oscillation circuit unit and the second oscillation circuit unit.

The determining device is further configured to measure a temperature of the lens barrel by summing oscillation signals output from the two or more oscillation circuits of the first oscillation circuit unit, and oscillation signals output from the two or more oscillation circuits of the second oscillation circuit unit.

The two or more oscillation circuits of the first oscillation circuit unit may be disposed in a first direction perpendicular to an optical axis, and the two or more oscillation circuits of the second oscillation circuit unit may be disposed in the first direction.

Each of the two or more oscillation circuits of the first oscillation circuit unit and the two or more oscillation circuits of the second oscillation circuit unit includes a coil and a capacitor.

An inductance of the coil included in each of the first oscillation circuit unit and the second oscillation circuit unit is configured to change based on a movement of the lens barrel and a temperature change of the lens barrel.

Frequencies of the plurality of oscillation signals may be determined based on the inductance of the coil included in each of the first oscillation circuit unit and the second oscillation circuit unit.

The determining device is configured to compensate for frequency change amounts of the plurality of oscillation signals based on the temperature change of the lens barrel by summing a difference between the oscillation signals output from the two or more oscillation circuits of the first oscillation circuit unit, and a difference between the oscillation signals output from the two or more oscillation circuits of the second oscillation circuit unit, and is configured to calculate a position of the lens barrel in the first direction based on a sum of the differences.

The determining device is configured to compensate for frequency change amounts of the plurality of oscillation signals based on the temperature change of the lens barrel by summing a difference between oscillation signals output from two or more oscillation circuits disposed on the first side of the lens barrel in the first direction, and a difference between oscillation signals output from two or more oscillation circuits disposed on the second side of the lens barrel in the first direction, the first direction being different from a position of the lens barrel in a second direction perpendicular to the optical axis, and is configured to calculate the position of the lens barrel in the second direction based on a sum of the differences.

Two or more sensing coils of the first oscillation circuit unit and two or more sensing coils of the second oscillation circuit unit may be disposed to be symmetrical to each other in relation to a plane formed in an optical axis direction and a first direction perpendicular to an optical axis.

In another general aspect, an actuator for a camera module includes two or more detectable elements, the detectable elements being respectively disposed on a first surface of a lens barrel and a second surface of the lens barrel; an oscillating element comprising a first oscillation circuit unit that includes two or more oscillation circuits disposed to face the first surface of the lens barrel, and a second oscillation circuit unit that includes two or more oscillation circuits disposed to face the second surface of the lens barrel; and a determining device configured to calculate a position of the lens barrel in response to frequencies of a plurality of oscillation signals output from the oscillating element, wherein each of the two or more oscillation circuits of the first oscillation circuit unit and the two or more oscillation circuits of the second oscillation circuit unit includes a coil and a capacitor, and the coil of each of the two or more oscillation circuits of the first oscillation circuit unit and the two or more oscillation circuits of the second oscillation circuit unit are configured to receive a driving signal.

The two or more oscillation circuits of the first oscillation circuit unit may be disposed in a first direction perpendicular to an optical axis, and the two or more oscillation circuits of the second oscillation circuit unit are disposed in the first direction.

An inductance of the coil in each of the first oscillation circuit unit and the second oscillation circuit unit is configured to change in response to a movement of the lens barrel and a temperature change of the lens barrel.

The frequencies of the plurality of oscillation signals may be determined based on the inductance of the coil in each of the first oscillation circuit unit and the second oscillation circuit unit.

The determining device is configured to compensate for frequency change amounts of the plurality of oscillation signals based on the temperature change of the lens barrel by summing a difference between the oscillation signals output from the two or more oscillation circuits of the first oscillation circuit unit and a difference between the oscillation signals output from the two or more oscillation circuits of the second oscillation circuit unit, and is configured to calculate the position of the lens barrel in the first direction based on the sum of the differences.

The determining device is configured to compensate for frequency change amounts of the plurality of oscillation signals based on the temperature change of the lens barrel by summing a difference between oscillation signals output from two or more oscillation circuits disposed on the first side of the lens barrel in the first direction, and a difference between oscillation signals output from two or more oscillation circuits disposed on the second side of the lens barrel in the first direction, the first direction being different from a position of the lens in a second direction perpendicular to the optical axis, and is configured to calculate the position of the lens barrel in the second direction based on a sum of the differences.

Two or more sensing coils of the first oscillation circuit unit and two or more sensing coils of the second oscillation circuit unit may be disposed to be symmetrical to each other in relation to a plane formed in an optical axis direction and a first direction perpendicular to an optical axis.

The determining device measures a temperature of the lens barrel by summing oscillation signals output from the two or more oscillation circuits of the first oscillation circuit unit and oscillation signals output from the two or more oscillation circuits of the second oscillation circuit unit.

In another general aspect, a processor-implemented actuation method includes detecting two or more elements respectively disposed on a first surface of a lens barrel of a camera actuator system, and a second surface of the lens barrel; determining frequencies of oscillation signals of each of at least a first oscillation circuit and a second oscillation circuit disposed on the first surface of the lens barrel, and a third oscillation circuit and a fourth oscillation circuit disposed on the second surface of the lens barrel; and calculating a position of the lens barrel in an X-axis direction and a Y-axis direction based on the determined frequencies of the oscillation signals.

The position of the lens barrel in the X-axis direction may be determined by summing a difference between the frequency of the first oscillation circuit and the frequency of the second oscillation circuit, and a difference between the frequency of the third oscillation circuit and the fourth oscillation circuit.

The position of the lens barrel in the Y-axis direction may be determined by summing a difference between the frequency of the first oscillation circuit and the frequency of the third oscillation circuit, and a difference between the frequency of the second oscillation circuit and the fourth oscillation circuit.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
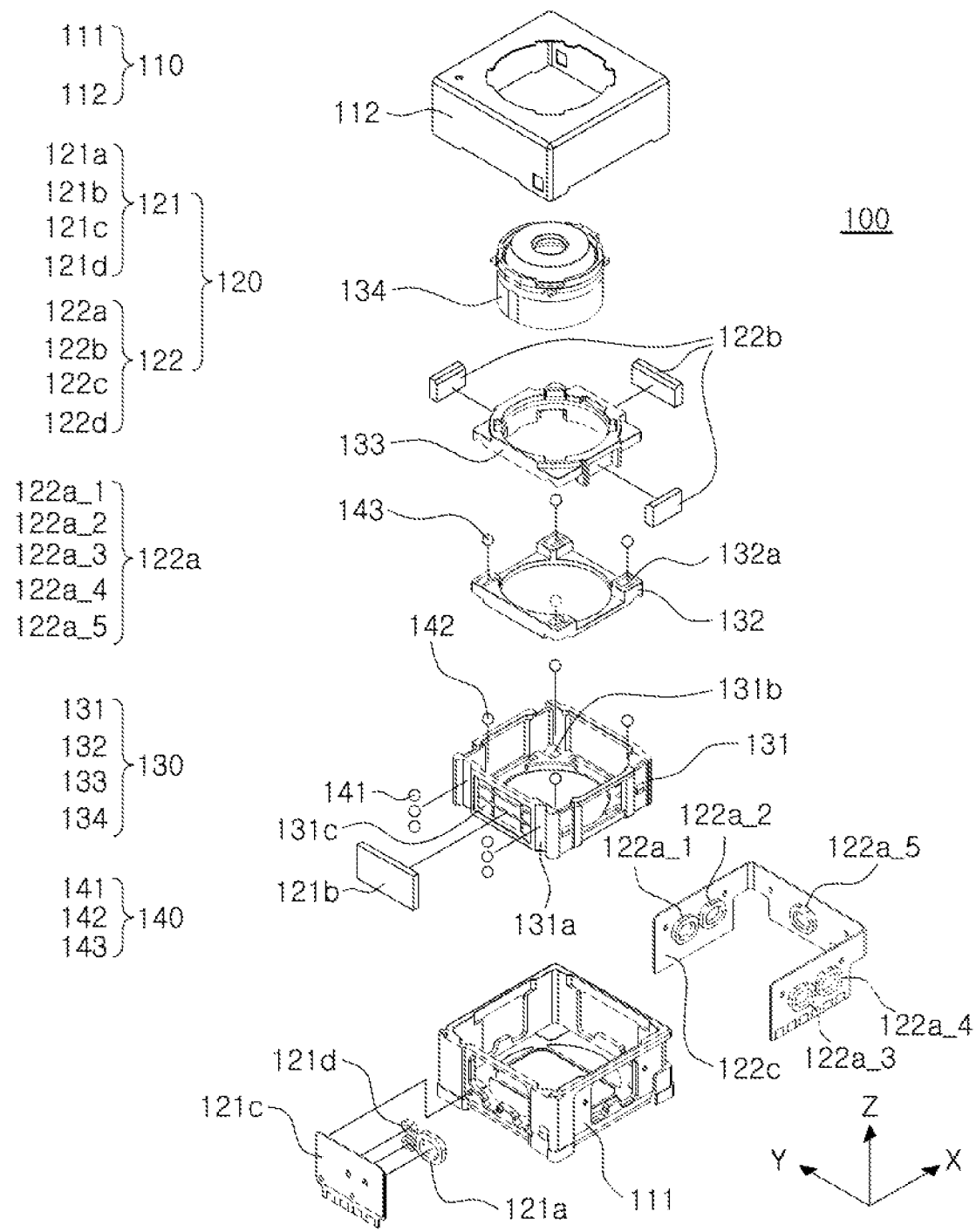
FIG. 1 is an exploded perspective view illustrating an example of a camera module.

Hereinafter, exemplary embodiments in the present disclosure will be described in more detail with reference to the accompanying drawings. In the drawings, shapes, sizes, and the like, of components may be exaggerated for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be construed as being limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both upward and downward orientations, depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

It is noted that use of the term "may" with respect to an example or embodiment, e.g., as to what an example or embodiment may include or implement, means that at least one example or embodiment exists where such a feature is included or implemented while all examples and embodiments are not limited thereto.

FIG. 1 is an exploded perspective view illustrating an example of a camera module.

In the example of FIG. 1, a camera module 100 may include a housing unit 110, actuators 120, and a lens module 130, and a ball bearing portion 140.

The camera module 100 may perform at least one of an autofocusing function and an optical image stabilization function, but is not limited thereto. As an example, in order for the camera module 100 to perform the autofocusing function and the optical image stabilization function, the lens module 130 may move in an optical axis direction (a Z-axis direction) and directions (X-axis and Y-axis directions) perpendicular to an optical axis in the housing unit 110.

The housing unit 110 may include a housing 111 and a shield case 112. As a non-limiting example, the housing 111 may be formed of a material that is easily molded. For example, the housing 111 may be formed of plastic. At least one actuator 120 may be mounted in the housing 111. As an example, a portion of components of a first actuator 121 may be mounted on a first side surface of the housing 111, and a portion of components of a second actuator 122 may be mounted on a portion of second to fourth side surfaces of the housing 111. The housing 111 may be configured to accommodate the lens module 130 therein. As an example, a space in which the lens module 130 may be completely or partially accommodated may be formed in the housing 111.

Six surfaces of the housing 111 may be open. As an example, a hole for an image sensor may be formed in a bottom surface of the housing 111, and a quadrangular hole, in which the lens module 130 is mounted, may be formed in a top surface of the housing 111. The first side surface of the housing 111 may be open in such a manner that a first driving coil 121a of the first actuator 121 may be inserted thereinto, and the second to fourth side surfaces of the housing 111 may be open in such a manner that a plurality of second coils 122a_1, 122a_2, 122a_3, 122a_4, and 122a_5 of the second actuator 122 may be inserted thereinto.

The shield case 112 may be configured to cover portions of the housing 111. As an example, the shield case 112 may be configured to cover the top surface, or a partial portion of the top surface, and four side surfaces of the housing 111. Alternatively, the shield case 112 may be configured to cover only the four side surfaces of the housing 111 or may be configured to partially cover the top surface and the four side surfaces of the housing 111. The shield case 112 may block electromagnetic waves generated during a driving process of the camera module. The electromagnetic waves may be generated at the time when the camera module is driven. When the electromagnetic waves are emitted externally from the camera module, the electromagnetic waves may affect other electronic components of the camera, and result in communication errors or camera malfunction. In order to prevent such a problem, the shield case 112 may be formed of, for example, a metal substance, and may be grounded to a ground pad of a substrate mounted on the bottom surface of the housing 111 to block the electromagnetic waves. On the other hand, for example, when the shield case 112 is formed of a plastic injection-molded product, a conductive paint may be applied to an inner surface of the shield case 112 or a conductive film or a conductive tape may be attached to the inner surface of the shield case 112 to block the electromagnetic waves. In this case, the conductive paint may be conductive epoxy, but is not limited thereto. For example, various materials having conductivity may be used as the conductive paint.

The number of actuators 120 may be plural. As an example, the actuators 120 may include the first actuator 121 which may be configured to move the lens module 130 in the Z-axis direction, and the second actuator 122, which may be configured to move the lens module 130 in the X-axis direction and the Y-axis direction.

The first actuator 121 may be mounted on the housing 111 and a first frame 131 of the lens module 130. As an example, a portion of the components of the first actuator 121 may be mounted on the first side surface of the housing 111, and other portions of the components of the first actuator 121 may be mounted on a first side surface of the first frame 131. The first actuator 121 may move the lens module 130 in the optical axis direction (the Z-axis direction). As an example, the first actuator 121 may include the first driving coil 121a, a first magnet 121b, a first substrate 121c, and at least one autofocusing (AF) sensing coil 121d. The first driving coil 121a and the AF sensing coil 121d may be formed on the first substrate 121c. The first substrate 121c may be mounted on the first side surface of the housing 111, and the first magnet 121b may be mounted on the first side surface 131c of the first frame 131 opposing the first substrate 121c.

As a non-limiting example, a first driving device (not illustrated) that provides a driving signal to the first driving coil 121a may be provided on the first substrate 121c. The first driving device may apply the driving signal to the first driving coil 121a to provide a driving force to the first magnet 121b. The first driving device may include a driver integrated circuit (IC) providing the driving signal to the first driving coil 121a. For example, when the driving signal is applied to the first driving coil 121a from the first driving device, a magnetic flux may be generated by the first driving coil 121a. The magnetic flux may interact with a magnetic field of the first magnet 121b to generate a driving force that enables relative movement of the first frame 131 and a lens barrel 134 with respect to the housing 111 depending on Fleming's left hand rule. The first driving device may include an H-bridge circuit that may be bi-directionally driven to apply the driving signal to the first driving coil 121a.

The lens barrel 134 may move in the same direction as a moving direction of the first frame 131 by movement of the first frame 131. The first actuator 121 may sense a strength of the magnetic field by the first magnet 121b by the AF sensing coil 121d and detect positions of the first frame 131 and the lens barrel 134.

The AF sensing coil 121d may be disposed outside of the first driving coil 121a, and may include at least one coil. An inductance of the AF sensing coil 121d may be changed depending on a displacement of the first magnet 121b. For example, when the first magnet 121b moves in a first direction, the strength of the magnetic field of the first magnet 121b on the AF sensing coil 121d may be changed or varied, and the inductance of the AF sensing coil 121d may thus be changed or varied. The first actuator 121 may determine displacements of the lens barrel 134 and the first frame 131 from the change in the inductance of at least one AF sensing coil 121d. As an example, the first actuator 121 may further include at least one capacitor, and the at least one capacitor and the AF sensing coil 121d may form a predetermined oscillation circuit. As an example, the number of capacitors included in the first actuator 121 may correspond to the number of coils of AF sensing coils 121d, and one capacitor and one AF sensing coil 121d may be configured in a form such as a predetermined LC oscillator or may be configured in a form such as a typical Colpitts oscillator.

The first actuator 121 may determine the displacement of the lens barrel 134 from a change in a frequency of an oscillation signal generated by the oscillation circuit. For example, when the inductance of the AF sensing coil 121d forming the oscillation circuit is changed, the frequency of the oscillation signal generated by the oscillation circuit may be changed, and the displacement of the lens barrel 134 may thus be detected on the basis of the change in the frequency.

The second actuator 122 may be mounted on the housing 111 and a third frame 133 of the lens module 130. As an example, a portion of the components of the second actuator 122 may be mounted on the second to fourth side surfaces of the housing 111, and other components of the second actuator 122 may be mounted on second to fourth side surfaces of the third frame 133. According to another example, the second actuator 122 may be mounted on a portion of the second to fourth side surfaces of the third frame 133 and the housing 111, or may be mounted on corners at which the second to fourth side surfaces are in contact with each other.

The second actuator 122 may move the lens module 130 in directions perpendicular to the optical axis, e.g. in the X-axis direction and the Y-axis direction. As an example, the second actuator 122 may include the plurality of second coils 122a_1, 122a_2, 122a_3, 122a_4, and 122a_5, a plurality of second magnets 122b, and a second substrate 122c.

The plurality of second coils 122a_1, 122a_2, 122a_3, 122a_4, and 122a_5 may be formed on the second substrate 122c. In an example, as the plurality of second coils, five second coils 122a_1, 122a_2, 122a_3, 122a_4, and 122a_5 may be used. Two second coils 122a_1 and 122a_2 of the five second coils 122a_1, 122a_2, 122a_3, 122a_4, and 122a_5 may be disposed on a second side surface of the second substrate 122c in the X-axis direction, two second coils 122a_3 and 122a_4 of the five second coils 122a_1, 122a_2, 122a_3, 122a_4, and 122a_5 may be disposed on a fourth side surface of the second substrate 122c in the X-axis direction, and one second coil 122a_5 of the five second coils 122a_1, 122a_2, 122a_3, 122a_4, and 122a_5 may be disposed on a third side surface of the second substrate 122c. According to an example, the number of second coils disposed on the respective side surfaces of the second substrate 122c may not be limited to five. The number of second coils may be less than or greater than five. As an example, two second coils may be disposed on the third side surface of the second substrate 122c.

The second substrate 122c may have a generally quadrangular shape of which one side is open, and may be mounted to surround the second to fourth side surfaces of the housing 111. The second magnets 122b may be mounted on the second to fourth side surfaces of the third frame 133, respectively, to face the second substrate 122c.

As a non-limiting example, a second driving device (not illustrated) that provides driving signals to the plurality of second coils 122a_1, 122a_2, 122a_3, 122a_4, and 122a_5 may be provided on the second substrate 122c. The second driving device may apply the driving signals to the plurality of second coils 122a_1, 122a_2, 122a_3, 122a_4, and 122a_5 to provide driving force to the second magnets 122b. The second driving device may include a driver IC providing the driving signals to the plurality of second coils 122a_1, 122a_2, 122a_3, 122a_4, and 122a_5. In detail, when the driving signals are provided from the second driving device to the plurality of second coils 122a_1, 122a_2, 122a_3, 122a_4, and 122a_5, magnetic fluxes may be generated by the plurality of second coils 122a_1, 122a_2, 122a_3, 122a_4, and 122a_5, and interact with magnetic fields of the second magnets 122b. The second driving device may change a magnitude and a direction of magnetic force generated between the plurality of second coils 122a_1, 122a_2, 122a_3, 122a_4, and 122a_5 and the plurality of second magnets 122b to enable relative movement of a second frame 132 or the third frame 133 with respect to the first frame 131. The second driving device may include an H-bridge circuit that may be bi-directionally driven to apply the driving signals to the plurality of second coils 122a_1, 122a_2, 122a_3, 122a_4, and 122a_5.

The lens barrel 134 may move in the same direction as a moving direction of the second frame 132 or the third frame 133 by the movement of the second frame 132 or the third frame 133. The second actuator 122 may sense strength of the magnetic fields of the second magnets 122b by the plurality of second coils 122a_1, 122a_2, 122a_3, 122a_4, and 122a_5, to detect a position of the lens barrel 134 in the same direction as the moving direction of the second frame 132 and the third frame 133. The second actuator 122 may detect a position of the second frame 132 or the third frame 133 from changes in inductances of the plurality of second coils 122a_1, 122a_2, 122a_3, 122a_4, and 122a_5.

The lens module 130 may be mounted in the housing unit 110. As an example, the lens module 130 may be accommodated in an accommodation space formed by the housing 111 and the shield case 112, and may be movable in at least three axis directions, for example, the Z-axis direction, the X-axis direction, and the Y-axis direction. The lens module 130 may include a plurality of frames. As an example, the lens module 130 may include the first frame 131, the second frame 132, and the third frame 133.

The first frame 131 may be configured to be movable with respect to the housing 111. As an example, the first frame 131 may move in the Z-axis direction of the housing 111 by the first actuator 121 described above. A plurality of guide grooves 131a and 131b may be formed in the first frame 131. As an example, a first guide groove 131a extended lengthwise in the Z-axis direction may be formed in a first side surface of the first frame 131, and second guide grooves 131b extended lengthwise in the Y-axis direction may be formed in four corners of an inner bottom surface of the first frame 131, respectively. The first frame 131 may be manufactured to have a form in which at least three side surfaces thereof are open. As an example, second and third side surfaces of the first frame 131 may be open, such that the second magnets 122b mounted on the third frame 133 and the plurality of second coils 122a_1, 122a_2, 122a_3, 122a_4, and 122a_5 mounted on the second substrate 122c disposed on the housing 111 may face each other.

The second frame 132 may be mounted in the first frame 131. As an example, the second frame 132 may be mounted in an internal space of the first frame 131. The second frame 132 may be configured to move in the Y-axis direction with respect to the first frame 131. As an example, the second frame 132 may move in the Y-axis direction along the second guide grooves 131b of the first frame 131.

A plurality of guide grooves 132a may be formed in the second frame 132. As an example, four third guide grooves 132a extended lengthwise in the X-axis direction may be formed in corners of the second frame 132, respectively. The third frame 133 may be mounted on the second frame 132. The third frame 133 may be mounted on an upper surface of the second frame 132. The third frame 133 may be configured to move in the X-axis direction with respect to the second frame 132. As an example, the third frame 133 may move in the X-axis direction along the third guide grooves 132a of the second frame 132. The plurality of second magnets 122b may be mounted on the third frame 133. As an example, three second magnets 122b may be mounted on the second to fourth side surfaces of the third frame 133, respectively.

On the other hand, the third frame 133 described above may be formed integrally with the second frame 132. In this case, the third frame 133 may be omitted, and the second frame 132 may move in the X-axis direction and the Y-axis direction.

The lens module 130 may include the lens barrel 134. As an example, the lens module 130 may include the lens barrel 134 including one or more lenses. The lens barrel 134 may have a hollow cylindrical shape, in which at least one lens that captures an image of a subject may be accommodated, and the lens may be provided in the lens barrel 134 along an X axis. The number of lenses stacked in the lens barrel 134 may depend on a design of the lens barrel 134, and the lenses may have optical characteristics such as the same refractive index or different refractive indices, or the like.

The lens barrel 134 may be mounted in the third frame 133. As an example, the lens barrel 134 may be fitted into the third frame 133 to thus move integrally with the third frame 133. The lens barrel 134 may be configured to move in the Z-axis direction, the X-axis direction, and the Y-axis direction. As an example, the lens barrel 134 may move in the Z-axis direction based on an actuation by the first actuator 121, and move in the X-axis and Y-axis directions based on an actuation by the second actuator 122.

The ball bearing portion 140 may guide the movement of the lens module 130. As an example, the ball bearing portion 140 may be configured in such a manner that the lens module 130 smoothly moves in one or more of the Z-axis direction, the X-axis direction, and the Y-axis direction. The ball bearing portion 140 may include first ball bearings 141, second ball bearings 142, and third ball bearings 143. As an example, the first ball bearings 141 may be disposed in the first guide groove 131a of the first frame 131 to allow the first frame 131 to smoothly move in the Z-axis direction. As another example, the second ball bearings 142 may be disposed in the second guide grooves 131b of the first frame 131 to allow the second frame 132 to smoothly move in the Y-axis. As another example, the third ball bearings 143 may be disposed in the third guide grooves 132a of the second frame 132 to allow the third frame 133 to smoothly move in the X-axis direction.

Each of the first and second ball bearings 141 and 142 may include at least three balls, but is not so limited, and the at least three balls of each of the first and second ball bearings 141 and 142 may be disposed in the first or second guide grooves 131a or 131b, respectively.

A lubricating material for reducing friction and noise may be filled in all the portions in which the ball bearing portion 140 is disposed. As an example, a viscous fluid may be injected into the respective guide grooves 131a, 131b, and 132a. As the viscous fluid, grease having excellent viscosity and lubricating characteristics may be used.

Figure 2:
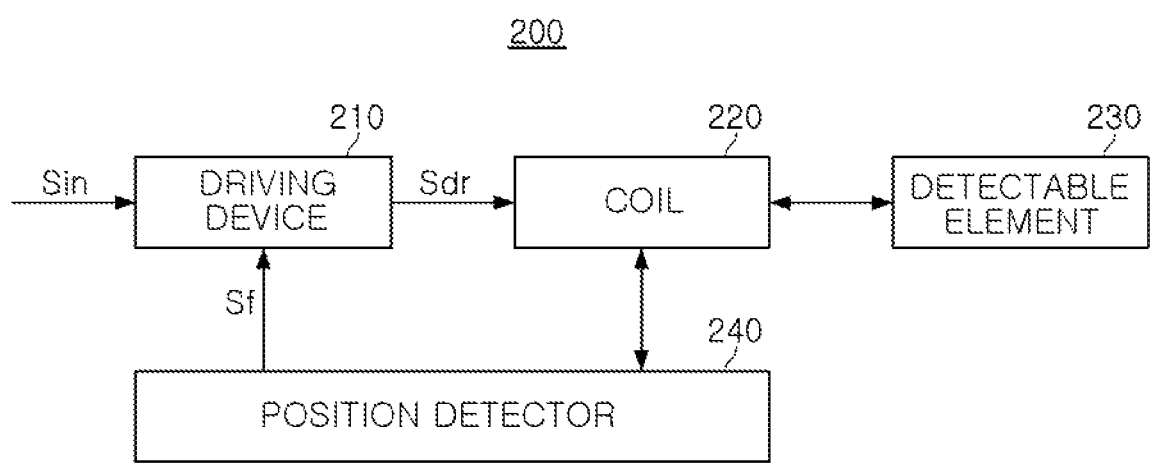
FIG. 2 is a block diagram illustrating an example of main components of an actuator of a camera module.

FIG. 2 is a block diagram illustrating an example of the main components of an actuator used in a camera module. An actuator 200 as illustrated in the example shown in FIG. 2 may correspond to the second actuator 122 of FIG. 1, but is not so limited. Alternately, the actuator 200 may correspond to the first actuator 121.

In the case that the actuator 200 of FIG. 2 corresponds to the second actuator 122 of FIG. 1, the actuator 200 may move the lens barrel in the directions perpendicular to the optical axis, to perform an optical image stabilization (OIS) function of the camera module. Therefore, for example, when the actuator 200 of FIG. 2 performs the OIS function, a driving device 210 may apply a driving signal to a coil 220 to provide a driving force in the directions perpendicular to the optical axis to a magnet, e.g., magnet 122b.

In an example, actuator 200 may include the driving device 210, the coil 220, an element 230 to be detected, and a position detector 240. Although only a single element 230 to be detected is illustrated in FIG. 2, this is only an example, and plural elements 230 to be detected may be disposed in the camera module.

The driving device 210 may generate a driving signal Sdr in response to an input signal Sin applied by an external source and a feedback signal Sf generated by the position detector 240, and may provide the generated driving signal Sdr to the coil 220. For example, when the driving signal Sdr is applied to the coil 220 from the driving device 210, the lens barrel may move in the directions perpendicular to the optical axis based on an electromagnetic interaction between the coil 220 and the magnet, e.g., magnet 122b. In this case, the coil 220 to which the driving signal Sdr is provided may correspond to all of the plurality of second coils 122a_1, 122a_2, 122a_3, 122a_4, and 122a_5 included in the second actuator 122 of FIG. 1.

The position detector 240 may calculate a position or a movement of the lens barrel based on the electromagnetic interaction between the magnet, e.g., magnet 122b and the coil 220, via the element 230 to be detected, and generate the feedback signal Sf. The position detector may provide the generated feedback signal Sf to the driving device 210. The element 230 to be detected may be provided, for example, on one side of the lens barrel, and may move in the same direction as a moving direction of the lens barrel. As an example, the element 230 to be detected may be respectively provided on a first surface and a second surface of the lens barrel, to oppose the coil 220. According to another example, the element 230 to be detected may be provided on a plurality of frames coupled to the lens barrel, in addition to the lens barrel. The element 230 to be detected may be formed of one of a magnetic material and a conductor. As an example, the element 230 to be detected may correspond to the plurality of second magnets 122b included in the second actuator 122 of FIG. 1. However, according to another example, the element 230 to be detected may be configured as a separate element, in addition to the plurality of second magnets 122b.

The position detector 240 may calculate the position of the lens barrel depending on an inductance of the coil 220. For example, when the element 230 to be detected is provided on one side of the lens barrel 134 (FIG. 1), and the element 230 to be detected moves, an area of the element to be detected 230 overlapping the coil 220 or a distance between the coil 220 and the element to be detected 230 is changed. The position detector 240 may therefore calculate positions of the lens barrel 134 in the X-axis and Y-axis directions depending on a change in the inductance of the coil that is based on the movement of the element 230 to be detected. In this case, the coil 220, of which the inductance is detected, may correspond to four second coils 122a_1, 122a_2, 122a_3, and 122a_4 among the plurality of second coils 122a_1, 122a_2, 122a_3, 122a_4, and 122a_5 included in the second actuator 122 of FIG. 1.

As a non-limiting example, the driving device 210 may provide driving signals to all of the five second coils 122a_1, 122a_2, 122a_3, 122a_4, and 122a_5, and the position detector 240 may calculate the position of the lens barrel from the inductances of four of the second coils 122a_1, 122a_2, 122a_3, and 122a_4. However, this is only an example, and the position detector 240 may calculate the position of the lens barrel from less than four of the second coils 122a_1, 122a_2, 122a_3, 122a_4, and 122a_5.

Figure 3:
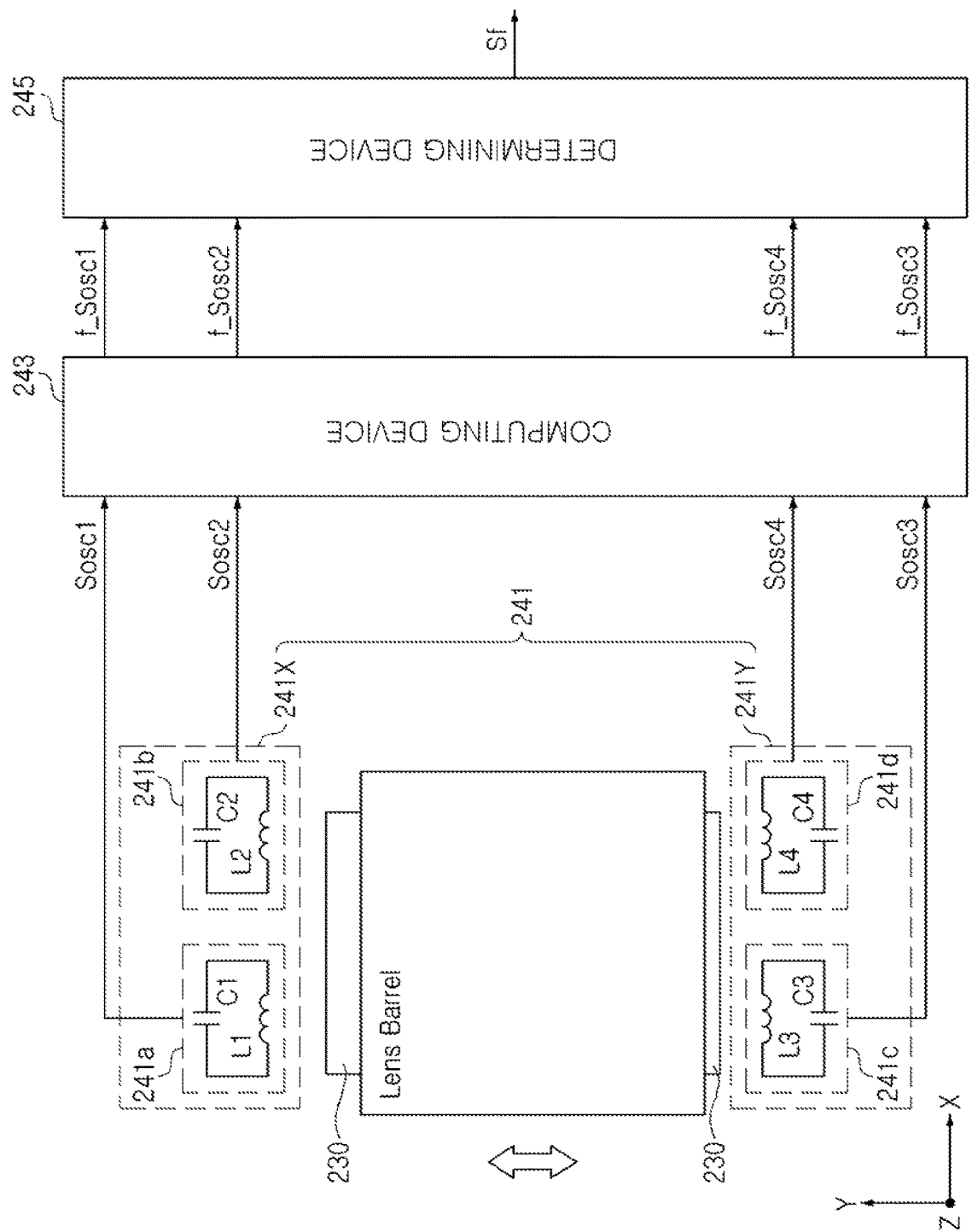
FIG. 3 is a block diagram illustrating an example of a position detector of a camera module.

FIG. 3 is a block diagram illustrating an example of a position detector of a camera module. An operation of detecting the position of the lens barrel with the position detector 240 will hereinafter be described with reference to FIGS. 1 through 3.

The position detector 240 according to an example may include an oscillating element 241, a computing device 243, and a determining device 245.

The oscillator 241 may include a first oscillation circuit unit 241X and a second oscillation circuit unit 241Y to generate a plurality of oscillation signals Sosc. Each of the first oscillation circuit unit 241X and the second oscillation circuit unit 241Y may include at least two oscillation circuits. The first oscillation circuit unit 241X may be disposed to face a first surface of the lens barrel, and the second oscillation circuit unit 241Y may be disposed to face a second surface of the lens barrel.

The first oscillation circuit unit 241X may include a first oscillation circuit 241a and a second oscillation circuit 241b, and the second oscillation circuit unit 241Y may include a third oscillation circuit 241c and a fourth oscillation circuit 241d.

Each of the first oscillation circuit 241a, the second oscillation circuit 241b, the third oscillation circuit 241c, and the fourth oscillation circuit 241d may include a coil and a capacitor, to constitute a predetermined LC oscillator. In detail, the first oscillation circuit 241a may include a first coil L1 and a first capacitor C1, the second oscillation circuit 241b may include a second coil L2 and a second capacitor C2, the third oscillation circuit 241c may include a third coil L3 and a third capacitor C3, and the fourth oscillation circuit 241d may include a fourth coil L4 and a fourth capacitor C4.

The first coil L1, the second coil L2, the third coil L3, and the fourth coil L4 respectively included in the first oscillation circuit 241a, the second oscillation circuit 241b, the third oscillation circuit 241c, and the fourth oscillation circuit 241d, may correspond to the plurality of second coils 122a_1, 122a_2, 122a_3, and 122a_4 included in the second actuator 122 of FIG. 1. As an example, the first coil L1 and the second coil L2 may correspond to the two second coils 122a_1 and 122a_2 disposed on the second side surface of the second substrate 122c, and the third coil L3 and the fourth coil L4 may correspond to the other two second coils 122a_3 and 122a_4 disposed on the fourth side surface of the second substrate 122c.

The first coil L1 and the second coil L2 may be disposed in one direction (the X-axis direction of FIG. 1) to oppose a first surface of the lens barrel, and the third coil L3 and the fourth coil L4 may be disposed in one direction (the X-axis direction of FIG. 1) to oppose a second surface of the lens barrel, opposing the first surface of the lens barrel. In this case, the first coil L1 and the third coil L3 may be disposed on one side in the X-axis direction, and the second coil L2 and the fourth coil L4 may be disposed on the other side in the X-axis direction. The first coil L1 and the second coil L2 may be provided to be symmetrical to the third coil L3 and the fourth coil L4 in relation to a plane formed by the optical axis and an X axis of a neutral position of the lens barrel. In this case, the neutral position refers to an initially set position when driving force is not provided to the magnet.

The first oscillation circuit 241a, the second oscillation circuit 241b, the third oscillation circuit 241c, and the fourth oscillation circuit 241d of FIG. 3, schematically illustrated in the drawings, may be configured in forms of various types of general oscillators.

Frequencies of the oscillation signals Sosc of the first oscillation circuit 241a, the second oscillation circuit 241b, the third oscillation circuit 241c, and the fourth oscillation circuit 241d may be determined by inductances of the first coil L1, the second coil L2, the third coil L3, and the fourth coil L4. For example, when the oscillation circuit is implemented by the LC oscillator including the coil and the capacitor, the frequency f of the oscillation signal Sosc may be represented by Equation 1. In Equation 1, I indicates inductances of the first coil L1, the second coil L2, the third coil L3, and the fourth coil L4, and c indicates capacitances of the first capacitor C1, the second capacitor C2, the third capacitor C3, and the fourth capacitor C4. In this case, intrinsic inductances of the first coil L1, the second coil L2, the third coil L3, and the fourth coil L4 may be substantially the same as each other.

$$f = \frac{1}{2\pi\sqrt{lc}}$$ [Equation 1]

For example, when the lens barrel moves, the strength of a magnetic field of the element 230 to be detected which has an influence on the inductances of the first coil L1, the second coil L2, the third coil L3, and the fourth coil L4 of the oscillating element 241 is changed, and the inductances of the first coil L1, the second coil L2, the third coil L3, and the fourth coil L4 may thus be changed. Therefore, frequencies of a first oscillation signal Sosc1, a second oscillation signal Sosc2, a third oscillation signal Sosc3, and a fourth oscillation signal Sosc4 that are respectively output from the first oscillation circuit 241a, the second oscillation circuit 241b, the third oscillation circuit 241c, and the fourth oscillation circuit 241d may be changed depending on relative movements of the element 230 to be detected. According to an example, a magnetic material having relatively high magnetic permeability may be disposed between the element 230 to be detected and the oscillating element 241, to increase ratios of change in the inductances of the first coil L1, the second coil L2, the third coil L3, and the fourth coil L4, based on the movement of the element t 230 to be detected.

The computing device 243 may compute frequencies of the first oscillation signal Sosc1, the second oscillation signal Sosc2, the third oscillation signal Sosc3, and the fourth oscillation signal Sosc4 respectively generated by the first oscillation circuit 241a, the second oscillation circuit 241b, the third oscillation circuit 241c, and the fourth oscillation circuit 241d. As an example, the computing device 243 may compute respective frequencies f_Sosc1, f_Sosc2, f_Sosc3, and f_Sosc4 of the first oscillation signal Sosc1, the second oscillation signal Sosc2, the third oscillation signal Sosc3, and the fourth oscillation signal Sosc4, using reference clocks CLK. As a non-limiting example, the computing device 243 may count the oscillation signals using the reference clocks CLK, and may compute the frequencies using the number of counted reference clocks CLK and frequencies of the reference clocks CLK. As an example, the computing device 243 may count oscillation signals during a reference section as the reference clocks CLK.

The determining device 245 may receive the respective frequencies f_Sosc1, f_Sosc2, f_Sosc3, and f_Sosc4 of the first oscillation signal Sosc1, the second oscillation signal Sosc2, the third oscillation signal Sosc3, and the fourth oscillation signal Sosc4 from the computing device 243, and determine positions of the lens barrel in the X-axis and Y-axis directions based on the frequencies f_Sosc1, f_Sosc2, f_Sosc3, and f_Sosc4.

The determining device 245 may determine the position of the lens barrel in the X-axis direction by summing a difference between the first frequency f_Sosc1 and the second frequency f_Sosc2 and a difference between the third frequency f_Sosc3 and the fourth frequency f_Sosc4, as represented by the following Equation 2:

$(f\_Sosc1-f\_Sosc2)+(f\_Sosc3-f\_Sosc4).$ [Equation 2]

For example, when the lens barrel moves along the X axis, directions of changes in the inductances of the first coil L1 and the third coil L3 and changes in the inductances of the second coil L2 and the fourth coil L4 may be different from each other. When the lens barrel moves in one direction of the X axis, in a case in which the inductances of the first coil L1 and the third coil L3 are increased, the inductances of the second coil L2 and the fourth coil L4 may be decreased.

Therefore, the position of the lens barrel in the X-axis direction may be calculated from the difference between the first frequency f_Sosc1 and the second frequency f_Sosc2 and the difference between the third frequency f_Sosc3 and the fourth frequency f_Sosc4, respectively.

According to an example, the position of the lens barrel in the X-axis direction may be determined by summing the difference between the first frequency f_Sosc1 and the second frequency f_Sosc2 and the difference between the third frequency f_Sosc3 and the fourth frequency f_Sosc4, rather than performing subtraction between the first frequency f_Sosc1 and the second frequency f_Sosc2 or subtraction between the third frequency f_Sosc3 and the fourth frequency f_Sosc4, such that inductance values of the coils depending on movement of the lens barrel in the Y-axis direction may be compensated for.

The determining device 245 may determine the position of the lens barrel in the Y-axis direction by summing a difference between the first frequency f_Sosc1 and the third frequency f_Sosc3 and a difference between the second frequency f_Sosc2 and the fourth frequency f_Sosc4, as represented by the following Equation 3:

$(f\_Sosc1-f\_Sosc3)+(f\_Sosc2-f\_Sosc4).$ [Equation 3]

In FIG. 1, for example, when the lens barrel moves along a Y axis, directions of changes in the inductances of the first coil L1 and the second coil L2 and changes in the inductances of the third coil L3 and the fourth coil L4 may be different from each other. For example, when the lens barrel moves in one direction of the Y axis, in a case in which the inductances of the first coil L1 and the second coil L2 are increased, the inductances of the third coil L3 and the fourth coil L4 may be decreased.

Therefore, the position of the lens barrel in the Y-axis direction may be calculated from the difference between the first frequency f_Sosc1 and the third frequency f_Sosc3 and the difference between the second frequency f_Sosc2 and the fourth frequency f_Sosc4, respectively.

According to an example, the position of the lens barrel in the Y-axis direction may be determined by summing the difference between the first frequency f_Sosc1 and the third frequency f_Sosc3 and the difference between the second frequency f_Sosc2 and the fourth frequency f_Sosc4, rather than performing subtraction between the first frequency f_Sosc1 and the third frequency f_Sosc3 or subtraction between the second frequency f_Sosc2 and the fourth frequency f_Sosc4, such that inductance values of the coils depending on movement of the lens barrel in the X-axis direction may be compensated for.

On the other hand, since the frequency of the oscillation circuit is changed depending on a received temperature of the camera module, as well as a displacement of the element 230 to be detected that is disposed with the lens barrel, the change in the frequency of the oscillation signal based on the temperature should be compensated for, to precisely detect a position of the element 230 to be detected.

According to Equation 2, a change amount in the frequency of the oscillation signal based on the temperature may be removed by summing the difference between the first frequency f_Sosc1 and the second frequency f_Sosc2 and the difference between the third frequency f_Sosc3 and the fourth frequency f_Sosc4. Likewise, according to Equation 3, a change amount in the frequency of the oscillation signal based on the temperature may be removed by summing the difference between the first frequency f_Sosc1 and the third frequency f_Sosc3 and the difference between the second frequency f_Sosc2 and the fourth frequency f_Sosc4.

In addition, as represented by Equation 4, the determining device 245 may measure an external temperature of the camera module by summing the first frequency f_Sosc1, the second frequency f_Sosc2, the third frequency f_Sosc3, and the fourth frequency f_Sosc4.

$$f\_Sosc1 + f\_Sosc2 + f\_Sosc3 + f\_Sosc4 \qquad \text{[Equation 4]}$$

According to an example, since the first frequency f_Sosc1, the second frequency f_Sosc2, the third frequency f_Sosc3, and the fourth frequency f_Sosc4 may be respectively changed, depending on the displacement of the element 230 to be detected that is disposed with the lens barrel, the first frequency f_Sosc1, the second frequency f_Sosc2, the third frequency f_Sosc3, and the fourth frequency f_Sosc4 may not be used individually to measure the temperature of the camera module. However, since the total sum of the first frequency f_Sosc1, the second frequency f_Sosc2, the third frequency f_Sosc3, and the fourth frequency f_Sosc4 is constant regardless of the displacement of the element 230 to be detected, the temperature of the camera module may be measured from the total sum of the first frequency f_Sosc1, the second frequency f_Sosc2, the third frequency f_Sosc3, and the fourth frequency f_Sosc4.

as a non-limiting example, the determining device 245 may include a memory. Position and temperature information of the lens barrel that correspond to frequencies of oscillation signals may be stored in the memory. The memory may be implemented by a nonvolatile memory including one of a flash memory, an electrically erasable programmable read-only memory (EEPROM), and a ferroelectric random access memory (FeRAM). The determining device 245 may determine the position of the lens barrel by comparing computing results according to Equations 2 and 3 with the position information of the lens barrel stored in the memory, and measure the external temperature of the camera module by comparing a computing result according to Equation 4 with the temperature information stored in the memory.

As set forth above, the actuator for a camera module according to an example may precisely detect the position of a magnet based on the changes in the inductances of the coils. Further, the actuator for a camera module may not include a separate hall sensor. Accordingly, the manufacturing cost of the actuator for the camera module may be reduced and space efficiency of the actuator for a camera module may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for a camera module, the actuator comprising:
   two or more detectable elements, the detectable elements being respectively disposed on a first surface of a lens barrel and a second surface of the lens barrel;
   an oscillating element comprising a first oscillation circuit unit that comprises two or more oscillation circuits disposed to face the first surface of the lens barrel, and a second oscillation circuit unit that comprises two or more oscillation circuits disposed to face the second surface of the lens barrel; and
   a determining device configured to calculate a position of the lens barrel in response to oscillation signals output from the oscillating element,
   wherein the determining device is configured to calculate the position of the lens barrel based on determined frequencies of oscillation signals of the first oscillation circuit unit and the second oscillation circuit unit, and configured to determine a temperature of the lens barrel based on the oscillation signals.

2. The actuator for a camera module of claim 1, wherein the determining device is further configured to measure the temperature of the lens barrel by summing oscillation signals output from the two or more oscillation circuits of the first oscillation circuit unit, and oscillation signals output from the two or more oscillation circuits of the second oscillation circuit unit.

3. The actuator for a camera module of claim 1, wherein the two or more oscillation circuits of the first oscillation circuit unit are disposed in a first direction perpendicular to an optical axis, and the two or more oscillation circuits of the second oscillation circuit unit are disposed in the first direction.

4. The actuator for a camera module of claim 3, wherein each of the two or more oscillation circuits of the first oscillation circuit unit and the two or more oscillation circuits of the second oscillation circuit unit comprises a coil and a capacitor.

5. The actuator for a camera module of claim 4, wherein an inductance of the coil included in each of the first oscillation circuit unit and the second oscillation circuit unit is configured to change based on a movement of the lens barrel and a temperature change of the lens barrel.

6. The actuator for a camera module of claim 5, wherein frequencies of the plurality of oscillation signals are determined based on the inductance of the coil included in each of the first oscillation circuit unit and the second oscillation circuit unit.

7. The actuator for a camera module of claim 6, wherein the determining device is configured to compensate for frequency change amounts of the plurality of oscillation signals based on the temperature change of the lens barrel by summing a difference between the oscillation signals output from the two or more oscillation circuits of the first oscillation circuit unit, and a difference between the oscillation signals output from the two or more oscillation circuits of the second oscillation circuit unit, and is configured to calculate a position of the lens barrel in the first direction based on a sum of the differences.

8. The actuator for a camera module of claim 6, wherein the determining device is configured to compensate for frequency change amounts of the plurality of oscillation signals based on the temperature change of the lens barrel by summing a difference between oscillation signals output from two or more oscillation circuits disposed on the first side of the lens barrel in the first direction, and a difference between oscillation signals output from two or more oscillation circuits disposed on the second side of the lens barrel in the first direction, the first direction being different from a position of the lens barrel in a second direction perpendicular to the optical axis, and is configured to calculate the position of the lens barrel in the second direction based on a sum of the differences.

9. The actuator for a camera module of claim 1, wherein two or more sensing coils of the first oscillation circuit unit and two or more sensing coils of the second oscillation circuit unit are disposed to be symmetrical to each other in relation to a plane formed in an optical axis direction.

10. An actuator for a camera module, the actuator comprising:
    two or more detectable elements, the detectable elements being respectively disposed on a first surface of a lens barrel and a second surface of the lens barrel;
    an oscillating element comprising a first oscillation circuit unit that comprises two or more oscillation circuits disposed to face the first surface of the lens barrel, and a second oscillation circuit unit that comprises two or more oscillation circuits disposed to face the second surface of the lens barrel; and
    a determining device configured to calculate a position of the lens barrel in response to frequencies of a plurality of oscillation signals output from the oscillating element, and configured to determine a temperature of the lens barrel based on the plurality of oscillation signals,
    wherein each of the two or more oscillation circuits of the first oscillation circuit unit and the two or more oscillation circuits of the second oscillation circuit unit comprises a coil and a capacitor, and the coil of each of the two or more oscillation circuits of the first oscillation circuit unit and the two or more oscillation circuits of the second oscillation circuit unit are configured to receive a driving signal.

11. The actuator for a camera module of claim 10, wherein the two or more oscillation circuits of the first oscillation circuit unit are disposed in a first direction perpendicular to an optical axis, and the two or more oscillation circuits of the second oscillation circuit unit are disposed in the first direction.

12. The actuator for a camera module of claim 11, wherein an inductance of the coil in each of the first oscillation circuit unit and the second oscillation circuit unit is configured to change in response to a movement of the lens barrel and a temperature change of the lens barrel.

13. The actuator for a camera module of claim 12, wherein the frequencies of the plurality of oscillation signals are determined based on the inductance of the coil in each of the first oscillation circuit unit and the second oscillation circuit unit.

14. The actuator for a camera module of claim 12, wherein the determining device is configured to compensate for frequency change amounts of the plurality of oscillation signals based on the temperature change of the lens barrel by summing a difference between the oscillation signals output from the two or more oscillation circuits of the first oscillation circuit unit and a difference between the oscillation signals output from the two or more oscillation circuits of the second oscillation circuit unit, and is configured to calculate the position of the lens barrel in the first direction based on the sum of the differences.

15. The actuator for a camera module of claim 12, wherein the determining device is configured to compensate for frequency change amounts of the plurality of oscillation signals based on the temperature change of the lens barrel by summing a difference between oscillation signals output from two or more oscillation circuits disposed on the first side of the lens barrel in the first direction, and a difference between oscillation signals output from two or more oscillation circuits disposed on the second side of the lens barrel in the first direction, the first direction being different from a position of the lens in a second direction perpendicular to the optical axis, and is configured to calculate the position of the lens barrel in the second direction based on a sum of the differences.

16. The actuator for a camera module of claim 12, wherein two or more sensing coils of the first oscillation circuit unit and two or more sensing coils of the second oscillation circuit unit are disposed to be symmetrical to each other in relation to a plane formed in an optical axis direction and a first direction perpendicular to an optical axis.

17. The actuator for a camera module of claim 10, wherein the determining device measures the temperature of the lens barrel by summing oscillation signals output from the two or more oscillation circuits of the first oscillation circuit unit and oscillation signals output from the two or more oscillation circuits of the second oscillation circuit unit.

18. A processor-implemented actuation method comprising:
    detecting two or more elements respectively disposed on a first surface of a lens barrel of a camera actuator system, and a second surface of the lens barrel;
    determining frequencies of oscillation signals of each of at least a first oscillation circuit and a second oscillation circuit disposed on the first surface of the lens barrel, and a third oscillation circuit and a fourth oscillation circuit disposed on the second surface of the lens barrel;
    calculating a position of the lens barrel in an X-axis direction and a Y-axis direction based on the determined frequencies of the oscillation signals; and
    determining a temperature of the lens barrel based on the oscillation signals.

19. The method of claim 18, wherein the position of the lens barrel in the X-axis direction is determined by summing a difference between the frequency of the first oscillation circuit and the frequency of the second oscillation circuit, and a difference between the frequency of the third oscillation circuit and the fourth oscillation circuit.

20. The method of claim 18, wherein the position of the lens barrel in the Y-axis direction is determined by summing a difference between the frequency of the first oscillation circuit and the frequency of the third oscillation circuit, and a difference between the frequency of the second oscillation circuit and the fourth oscillation circuit.

* * * * *